A. E. SCHIERHORST
CODED CALL LETTER GENERATOR UTILIZING
COLD-CATHODE, GLOW-TRANSFER TUBE

3,154,640

Filed Oct. 20, 1960

INVENTOR
ALBERT E. SCHIERHORST
BY James B Boyer
ATTORNEY

United States Patent Office 3,154,640
Patented Oct. 27, 1964

3,154,640
CODED CALL LETTER GENERATOR UTILIZING COLD-CATHODE, GLOW-TRANSFER TUBE
Albert E. Schierhorst, Beltsville, Md., assignor to ACF Industries Incorporated, New York, N.Y., a corporation of New Jersey
Filed Oct. 20, 1960, Ser. No. 63,910
10 Claims. (Cl. 179—2)

This invention relates generally to electronic coded signal generators and the generation of coded radio system call letters.

In the manufacture of aircraft flight simulators provision must be made for the simulation of various types of radio aids to navigation. However, in attempting to keep pace with the recent advances made in these aircraft navigational aids, the complexity of such flight simulators has greatly increased. It is not unusual to find that full simulation of such systems as (a) Low Frequency Radio Range, (b) Instrument Landing System (ILS) approach markers, (c) Omni-directional Radio Range (VHF Omnirange) and (d) Tactical Air Navigation (TACAN) are all required in a single flight simulator. Each of these systems requires simulation of a coded identifying signal specifically tailored to the selected system, which signals often must be in agreement with the identifying signals assigned to an actual ground station. In order to make available to the flight simulator the call letters of actual ground stations for any of the navigational systems mentioned, a call letter generator must be provided which can furnish two, three or four call letters in sequence with no restriction as to alphabetical assignment. The generator must also be capable of being quickly adjusted to the call letters of the desired ground station and system.

The call letter generator or keyer therefore must not only be adjustable to any alphabetical output, but it must generate the letters at the proper rate and within the proper period as required by the specific system being simulated. For example, Omni-range call letters are generated once each six seconds, while TACAN identity is transmitted once each thirty seconds, and the keyer must be able accurately to handle both. In addition, the keyer should be arranged so that the spacing between succeeding letters is of a standard length, and so that the time duration of each letter is proportional to the number and length of the code characters used in its transmission. For example, the letter E in Morse code requires a single time unit for its transmission while the letters J, Q and Y require thirteen time units each. In order to provide keying realism it is necessary to transmit the selected call letters without crowding the code characters together or leaving long stretches of silence between them.

A further requirement for a call letter keyer is that it be capable of being controlled from the control panel of flight simulator without taking up a large amount of space, for space is usually in short supply on such panels.

In providing simulation of installations which must include a voice message in addition to the usual coded call letter signals, a further requirement is the provision of means for interrupting the normal cyclic repetition of coded signals, inserting the voice message, and then continuing the coded signal generation. However, in order to maintain its usefulness in simulating non-voice systems, a generator must be capable of producing not only a voice-interrupted output, but an output that is automatically repetitive and thus has no such interruption. Both types of output must be readily available to the operator of the simulating system.

Previous attempts to provide simulation of navigational radio aids have led to the development of mechanical, photoelectric or magnetic tape devices. Mechanical systems utilize such devices as a wiping contact upon a coded commutator disc, or a cam operated relay. Systems have also been devised utilizing photoelectric scanning of rotating discs, each disc being slotted in accordance with the Morse code characters representing that letter. Encoded call letters prerecorded on magnetic recording tape and played back as needed have also been used.

Although the prior art devices have been found satisfactory in many respects, each method has its shortcomings. Many of these devices are too expensive or take up excessive control panel space. Often the use of cams, wiping contacts and magnetic tapes is excluded by the design specifications. Some of the prior devices are overly complex and thus are difficult to repair, while others are unreliable, shortlived and in need of frequent adjustment.

The present invention overcomes these objections in that it provides an all-electronic system which is reliable and needs little adjustment. It may be remotely controlled so as to take up little control panel space, has a long life and is extremely versatile, furnishing as many call letters as may be required with no restriction as to alphabetical assignment and with a keying rate that may be varied in accordance with the requirements of the system being simulated. Thus, a feature of this invention is the provision of a fully electronic call letter keyer.

Another feature of the invention is the provision of an electronic call letter keyer capable of generating any desired combination of call letters.

A further feature is the provision of an electronic call letter keyer in which the keying rate and period, or repetition rate, may be remotely selected, and which provides call letters of rationalized length and standard spacing.

A still further feature of the invention is the provision of an electronic call letter keyer which is reliable, takes up little control panel space and is capable of producing a large variety of signals.

Another feature of the invention is the provision of a system which will selectively produce in Morse code the radio call letters of a plurality of navigational aid systems and their various stations.

Still another feature of the invention is the provision of a coded call letter generator which may be interrupted at specified intervals to allow the insertion of voiced call letters.

More specifically, the system of the invention comprises a plurality of call letter selectors, a pair of cold-cathode, glow-transfer tubes of the ten cathode variety, means to drive the glow-transfer tubes, and a plurality of output gates, one output gate being connected to each call letter selector. The call letter selectors are manually adjustable twenty-seven position switches, each position of the switch having six stationary contacts and six movable contacts. The various stationary contacts of each selector switch are connected to different ones of the cathodes of the first glow-transfer tube. Three of the six movable contacts of each selector switch are connected to an output gate, the remaining movable contacts of each selector switch providing letter termination and advance signals to the second glow-transfer tube. In response to these signals, the second glow-transfer tube operates the output gates of the call letter selectors in sequence, thus allowing a series of signals representing coded call letter characters to pass from the first glow-transfer tube through the selector switches to the output. The code utilized in the device of the invention is illustrated as being the Morse code, although the system may be adapted to any desired code.

These and other features of this invention may be more fully appreciated when considered in the light of the following specification and drawings in which:

FIG. 6 is a block diagram of an alternate embodiment of the system of FIG. 1.

Figure 1:
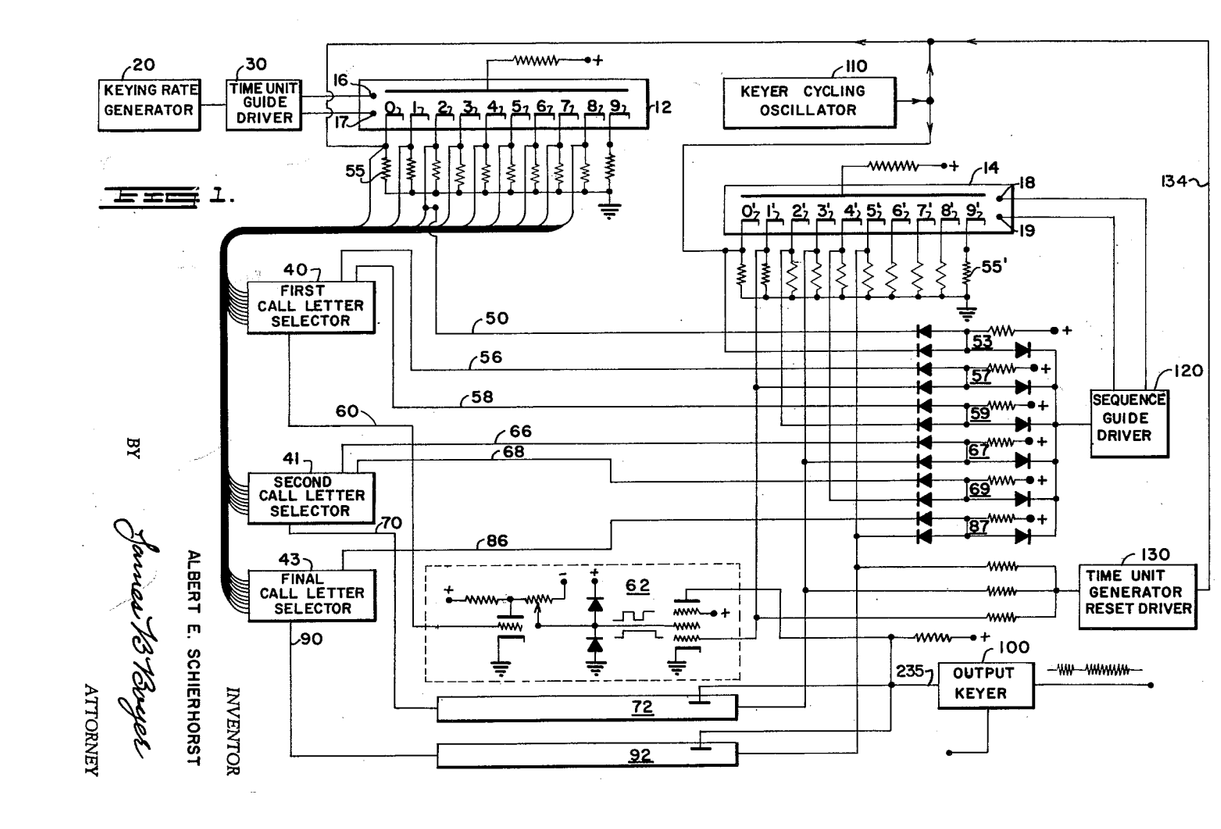
FIG. 1 is a block diagram of a preferred embodiment of a call letter keying system.

Reference is now made to the block diagram of FIG. 1, where cold-cathode glow-transfer tubes are shown at 12 and 14, each tube having ten cathodes labeled 0 through 9. These tubes both have pairs of guide electrodes located between each pair of cathodes, which electrodes, when properly energized, serve to transfer conduction from one cathode to another. For purposes of illustration, these guide electrodes are shown diagrammatically at the left-hand end of tube 12 as electrodes 16 and 17 and at the right-hand end of tube 14 as electrodes 18 and 19. A keying rate generator 20 and a time unit guide driver 30 are connected to the guide electrodes of tube 12, applying out-of-phase voltages to the electrodes 16 and 17 to transfer the conduction of the tube from one cathode to electrode 16, then to electrode 17 and finally to the next cathode. The keying rate generator 20 determines the rate at which succeeding voltages are applied to the guide driver 30.

Connected to the cathodes 0 through 9 of glow-transfer tube 12, which acts as a time unit generator, are the call letter selector switches shown at 40, 41 and 43 of FIG. 1. Each selector switch has 27 positions, 26 of the positions corresponding to letters of the alphabet and the 27th being the "off" position. Cathode 2 of tube 12 is also connected through line 50 to one diode of synchronizer AND gate 53. Each cathode is connected to ground through an individual resistor such as the resistor 55.

The first call letter selector 40 has three output lines 56, 58 and 60. Line 56 leads to one diode of letter termination AND gate 57, while line 58 leads to one diode of letter advance AND gate 59. Output line 60 leads to the inverter and gated code generator indicated at 62. Similarly, the second call letter selector 41 has an output line 66 leading to one diode of letter termination AND gate 67, an output line 68 leading to one diode of letter advance AND gate 69, and an output lead 70 connected to the inverter and code generator gate 72. As has been pointed out, as many call letter selector switches as desired may be utilized in this system, each selector switch except the last one having connections similar to those of switches 40 and 41. The final call letter selector 43 has an output lead 86 which is connected to one of the diodes of a letter termination AND gate 87. The other output of the final selector switch 43 is connected through line 90 to another inverter and code generator gate 92. No letter advance gate is provided for the final selector switch. An output signal from one of the code generator gates 62, 72 and 92 is fed to an output keyer 100 which provides an audio output in accordance with the signals received from the code generator gates.

The second cold-cathode glow-transfer tube 14 acts as a sequence generator, providing signals to the code generator gates 62, 72 and 92 in turn to enable these gates to conduct when no signals are received from the time unit generator tube 12 through the call letter selector switches. The odd numbered cathodes 1', 3', 5', 7' and 9' are connected to code generator gates to provide the sequential operation. Since FIG. 1 shows just three code generator gates, only cathodes 1', 3' and 5' are needed to be used as sequencers. The even numbered cathodes 2', 4', 6' and 8' are each connected to one diode of a letter advance AND gate. Again, since FIG. 1 shows only three call letter selectors only two letter advance gates are needed and thus only cathodes 2' and 4' are utilized for this purpose. Each cathode of the ten-cathode tube 14 is connected to ground through an individual resistor such as the resistor 55'. The 0' cathode of tube 14 is connected to one diode of the synchronizer AND gate 53 which is used in resetting the system in preparation for call letter generation. A keyer cycling oscillator 110, connected to the 0 and 0' cathodes of tubes 12 and 14, is utilized to initiate operation of the call letter generator, the synchronizer AND gate 53 serving to coordinate the operation of tubes 12 and 14.

The conduction beam of tube 14 is commutated from one cathode to the next by means of out-of-phase pulses applied to guide electrodes 18 and 19 by the sequence guide driver 120. Driver 120 produces two out-of-phase pulses upon receipt of a signal from any of the AND gates 53, 57, 59, 67, 69 or 87. Each of these gates is capable of producing a signal only when input signals are provided for both of its diodes simultaneously. Thus, for example, gate 53 can produce an output signal only when cathode 2 of tube 12 and cathode 0' of tube 14 are both conducting; the gate 57 can provide an output signal only when cathode 1' of tube 14 is conducting and the first call letter selector 40 is providing a letter termination signal on line 56; and gate 59 can provide an output only when cathode 2' of tube 14 is conducting simultaneously with the presence of a letter advance signal from letter selector 40 on line 58. An output from gate 53 will cause the pulse driver 120 to provide out-of-phase voltages to electrodes 18 and 19, causing the conduction beam of tube 14 to commutate from cathode 0' to electrode 18, then to electrode 19, and finally to cathode 1'. An output from gate 57 similarly causes the conduction of tube 14 to commutate from cathode 1' to cathode 2' by way of the guide electrodes. In this manner output pulses from succeeding gates cause the conduction of tube 14 to commutate to succeeding cathode until a signal has been received from each gate, at which time the generation of all the call letters has been completed.

The time unit generator reset driver 130 has its input connected through three resistors to the sequence generator cathodes 1', 3' and 5', so that upon the application of a signal from tube 14 to one of the code generator gates 62, 72 and 92, an input signal also will be applied to the driver 130. Upon receipt of such a signal, reest driver 130 provides a reset pulse to cathode 0 of time unit generator tube 12, causing the conduction beam of tube 12 to commutate directly to the 0 cathode. This prepares tube 12 for the call letter generating operation. Since the beam of tube 12 must be reset to the 0 cathode prior to the generation of each call letter, the reset driver 130 is connected to the code generator gates of the individual call letter selectors; thus, when a gating signal from a cathode of tube 14 is applied to one of the gates 62, 72 or 92, the conduction of tube 12 is immediately reset to the 0 cathode so that the call letter signals may be generated while the gate remains open.

Briefly, the device of FIG. 1 operates as follows. A signal from the keyer cycling oscillator is provided to initiate the operation, the signal being applied to the 0 and 0' cathodes of tubes 12 and 14, causing conduction therethrough. The keying rate generator 20 and the time unit guide driver 30 commutate the conduction beam of tube 12 until it reaches cathode 2 at which point gate 53 conducts, causing the beam of tube 14 to commutate to cathode 1'. Conduction through cathode 1' provides a gating signal to code generator 62 and provides an input to reset driver 130. Reset driver 130 immediately resets the conduction of tube 12 to cathode 0. Keying rate generator 20 and guide driver 30 continue commutating the conduction of tube 12, the rate of commutation being determined by the frequency of generator 20. As the beam of tube 12 commutates, output signals from call letter selectors 40, 41 and 43 are provided on lines 60, 70 and 90. These signals are applied to the inverter and code generator gates 62, 72 and 92. Since code generator gate 62 is the only one receiving a gate signal from tube 14 only the signals on line 60 are fed to the output keyer 100. Coded signals from line 60 continue to appear at the output of keyer 100 until such time as a letter termination signal appears on line 56. This signal causes gate 57 to provide an output pulse to driver 120, causing the conduction of tube 14 to be commutated from cathode 1' to cathode 2' and removing the gating signal from code generator gate 62. A letter advance signal on line 58, applied to one of the diodes of gate 59, then causes the beam of tube 14 to commutate to cathode 3', applying a gating signal to code generator gate 72. This causes the application of a reset signal to tube 12 and the process is repeated, this time with the signals appearing on line 70 being applied to the output keyer 100. The operation proceeds until each call letter has been generated in turn.

Figure 3:
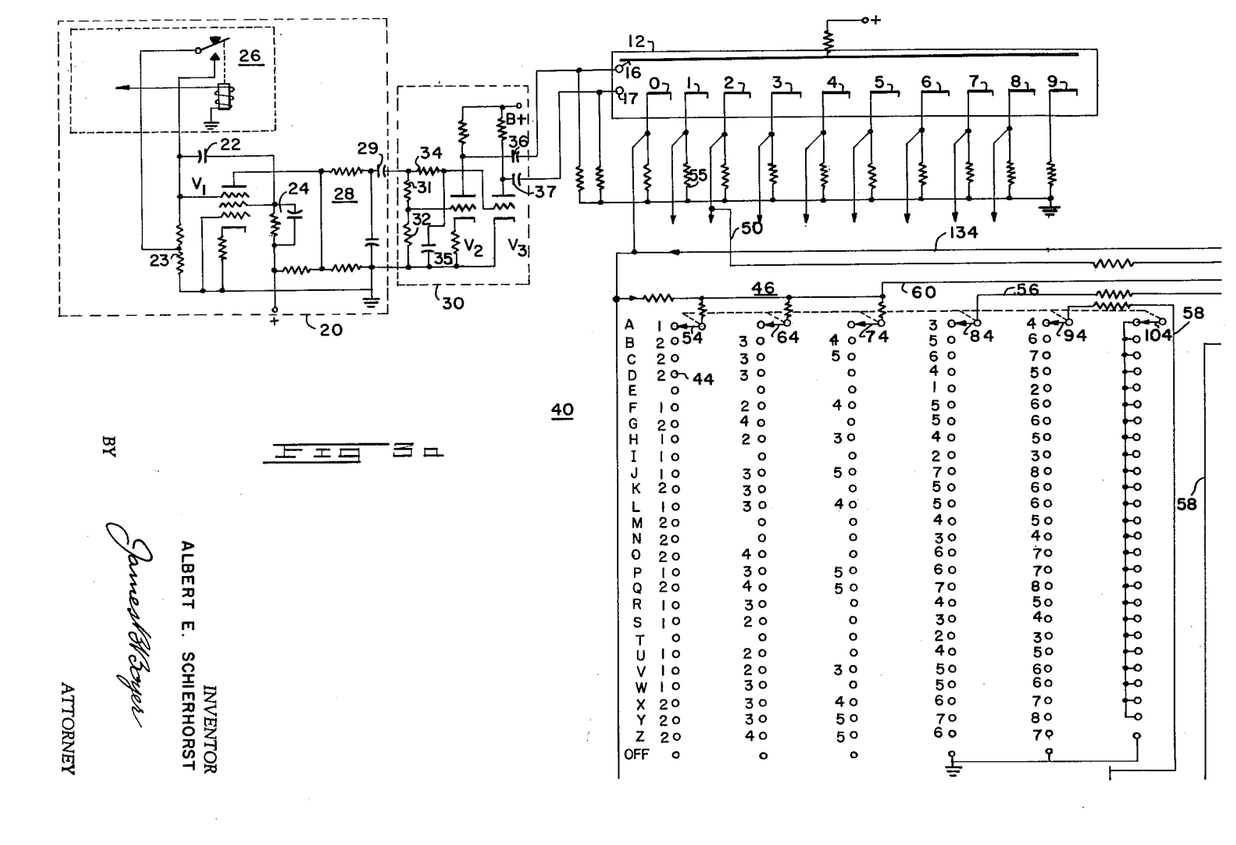
FIGS. 3a to 3d show a schematic diagram of the embodiment of FIG. 1.
Figure 3D:
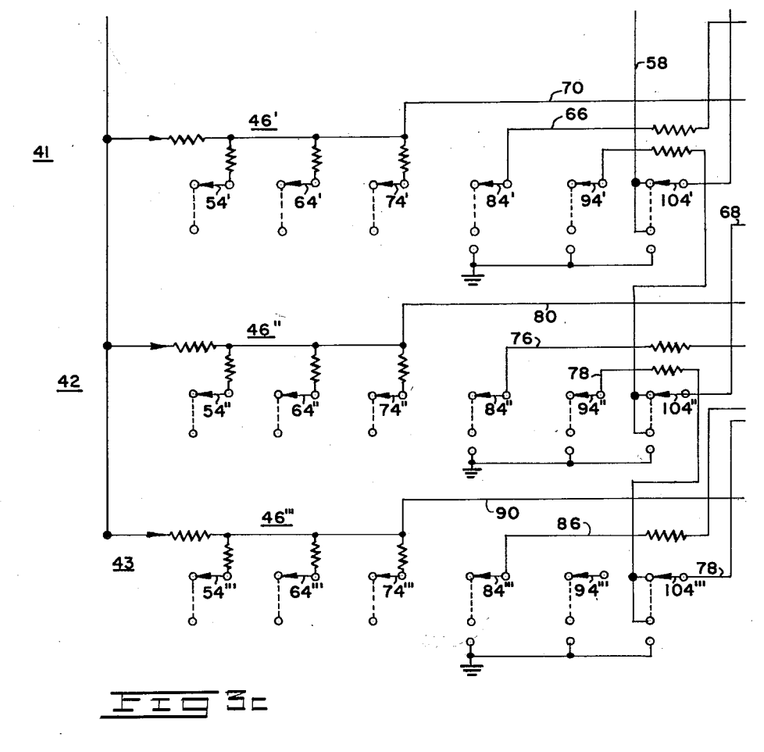
Figure 4:
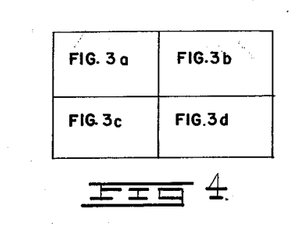
FIG. 4 is a diagram of how FIGS. 3a through 3d should be placed in relation to one another.

A more detailed schematic diagram of the circuitry shown in FIG. 1 is illustrated in FIGS. 3a, 3b, 3c and 3d which are to be placed together as shown in FIG. 4. Corresponding elements of FIGS. 1 and 3 are identified by the same numeral. Referring now to FIG. 3a, there is shown in detail specific embodiments of the keying rate generator 20, the guide driver 30 and the first call letter selector 40. Also shown in FIG. 3a is the glow-transfer tube 12 which is utilized as a time unit generator. The keying rate generator 20 comprises a free running oscillator having a stable frequency for a given set of parameters. The oscillator, which may be of any suitable design, normally operates at a frequency of approximately six cycles per second. The illustrated oscillator has a capacitor 22 connected between the screen and suppressor grids of a pentode $V_1$, a tapped resistor 23 connected between the suppressor grid and ground, and an RC circuit 24 connected between the screen and the plate. The control grid of the pentode is connected to ground. The parameters of elements 22, 23 and 24 are so designed as to provide the desired frequency of operation. A short-circuiting switch 26 may be provided which will allow a portion of the tapped resistance 23 to be removed from the oscillator circuit, thus changing the frequency of oscillation. Such a switch is useful when it is desired to change the operation of the device from simulation of the call letters of one type of navigational aid system to another such system which operates at a different rate. Integrating circuit 28 and coupling capacitor 29 are connected to the output of the oscillator circuit and provide input pulses to the guide driver 30.

The guide driver 30 includes two vacuum tube triodes $V_2$ and $V_3$, each tube having an input circuit and an output circuit. The pulse from keying rate generator 20 is applied to the grid of triode $V_2$ by way of voltage divider resistances 31 and 32. The amplified output pulse from tube $V_2$ is applied to guide electrode 16 through isolating capacitor 36. The input signal received from keying rate generator 20 is applied to the control grid of tube $V_3$ through the RC network 34, 35. The capacitor 35 serves to delay the conduction of tube $V_3$ slightly. The amplified output signal of this tube, which is applied to guide electrode 17 through capacitor 37, is therefore delayed in time with respect to the voltage applied to electrode 16. As previously mentioned, the application of these out-of-phase voltages to guide electrodes 16 and 17 results in the commutation of the conduction of tube 12 from one cathode to the next.

This commutation is accomplished by applying to the guide electrodes voltage pulses having a peak magnitude less than the plate-to-cathode voltage of the glow-transfer tube. As the voltage on electrodes 16 decreases to a value less than that of the conducting cathode, the conduction beam of the tube is attracted to the electrode 16 which is located nearest that cathode, cutting off the current to the cathode. The tube continues to conduct through this electrode 16 until such time as the voltage pulse on all electrodes 16 has passed its peak and is increasing. As this voltage increases, the delayed voltage on electrodes 17 is decreasing. At the time at which the value of the voltage on electrodes 17 is less than that of electrodes 16 the conduction beam transfers to the electrode 17 which is paired with the conducting electrode 16. This electrode carries the conduction of tube 12 until the voltage of such electrode 17 passes its peak value and increases to a value slightly above that of the plate-to-cathode voltage. At this time conduction transfers to the next succeeding cathode. Each such commutation of the conduction beam from one cathode to the next thus involves the pair of electrodes located between the two cathodes and represented in the drawings by 16 and 17.

By proper choice of the circuit parameters of guide driver 30 the phase angle between the voltages applied to electrodes 16 and 17 will be such that the conducting beam of tube 12 will be present at any given cathode for the same length of time that it takes to commutate the glow from one cathode to the next. This results in the glow-transfer tube 12 having equal on-off commutation, which characteristic enables the system to provide the basic time-unit building blocks required by the Morse code.

As was noted with respect to FIG. 1 each cathode of the cold-cathode glow-transfer tube 12 is connected through a resistor such as resistor 55 to ground. Guide electrodes 16 and 17 are similarly connected through a resistor to ground. A suitable bias voltage is applied to the plate of tube 12.

Indicated generally at 40 in FIG. 3a is a diagrammatic representation of a call letter selector switch. As illustrated, the switch has twenty-seven positions, alphabetical positions A through Z and an OFF position. Each position has six stationary contacts such as contact 44. Six movable contacts 54, 64, 74, 84, 94 and 104 are provided which move simultaneously to make contact with the stationary contacts of any desired switch position. Movable contacts 54, 64 and 74 are connected to output line 60 through an isolating network 46 of resistances. Movable contact 84 is connected to output line 65 to carry the letter termination signal from selector switch 40 to one diode of AND gate 57. Movable contact 94 is connected to output line 58, which line carries the letter advance signal from switch 40 through contact 104 of the second call letter selector switch 41, shown in FIG. 3c, to one diode of letter advance AND gate 59. The movable contact 104 of selector switch 40 is not used.

Cathodes 1 through 9 of the time unit generator tube 12 are connected to various ones of the array of stationary contacts of the selector switch in such a manner that the movable contacts 54, 64, 74, 84 and 94 may be positioned so as to be connected to selected cathodes. By proper arrangement of the cathode connections coded output signals representing a selected letter of the alphabet may be obtained from the isolating network 46 and applied to output line 60 as the conduction of tube 12 commutates from one cathode to the next under the control of the keying rate generator 20 and the time unit guide driver 30. In a similar manner letter termination and letter advance signals are applied to lines 56 and 58. It should be noted that the 0 cathode of tube 12 is permanently connected to the isolating network 46 of each call letter selector switch. During the conduction of a cathode which is connected either directly or through a movable contact to an output line a positive signal appears on that line. During the time that the conduction of tube 12 is between cathodes, that is, when conduction is taking place between the plate and electrodes 16 or 17, and during the time when conduction is to a cathode which is not connected to a movable contact no signals appear on the output lines. Conduction between the plate of tube 12 and cathode 0 always produces a positive signal in the output line 60. The particular contacts to which the various cathodes are connected is indicated in the diagram 40, the numbers beside the stationary contacts corresponding with the number of the cathode to which each contact is connected. Thus, for the letter A the left-most contact is connected to cathode 1, the next two contacts have no connections, the fourth contact is connected to cathode 3 and the fifth contact is connected to cathode 4. The particular connections illustrated provide output signals in Morse code, although other codes may be used.

The call letter selectors 41, 42 and 43, shown in FIG. 3c, are each identical to the selector switch 40, corresponding stationary contacts being connected to the same cathode elements of tube 12. In selector switches 41, 42 and 43 movable contacts 104′, 104″ and 104‴ are arranged to carry the letter advance signal output from the preceding selector switch, while in selector switch 40 contact 104 has no connection. The final selector switch 43 has no output line connected to contact 94‴, this contact being used in the preceding selector switches to provide a letter advance signal. With these two exceptions the external connections of switches 41, 42 and 43 are similar to those of switch 40.

The output signals from the isolating networks 46, 46′, 46″ and 46‴ of selector switches 40, 41, 42 and 43 are fed by way of lines 60, 70, 80 and 90, respectively, to the inverter and code generator gates 62, 72, 82 and 92, respectively, illustrated in FIG. 3d. The signal applied to each inverter and code generator gate will be positive whenever tube 12 is conducting through cathode 0 and whenever one of the switches 54, 64 or 74 are connected through a stationary contact to a conducting cathode of the time unit generator. The remainder of the time there will be no signal applied to the corresponding inverter and code generator gates. Inverter and code generator gate 62 is made up of an inverter circuit 140, a clamping circuit 142 and a gating circuit 144. When a positive signal from line 60 is applied to the grid of tube $V_4$, causing this tube to conduct, an amplified negative output signal is provided. This signal is clamped by diodes 146 and 148 of clamping circuit 142 and is applied to a control grid of dual control heptode $V_5$. This negative signal is of sufficient magnitude to drive the tube $V_5$ to cut off. When the positive pulse on line 60 comes to an end, such as when the conduction of tube 12 is being transferred from one cathode to another, there will be no negative signal applied to the control grid of $V_5$. If at the same time a positive signal from cathode 1′ of sequence generator tube 14 is applied by way of line 150 to the other control grid of tube $V_5$, this tube will conduct and will provide an output signal on line 152 which will be applied to the output keyer 100. In a similar manner positive signals appearing on lines 70, 80 and 90 will drive tubes $V_6$, $V_7$ and $V_8$ to cutoff. The absence of positive signals on any one of lines 70, 80 or 90 coinciding with the presence of a positive signal from sequence generator tube 14 on one of lines 154, 158 or 162 will result in conduction of the corresponding code generator gate tube to provide an output signal on line 156, 160 or 164.

Output signals obtained from the plates of any of tubes $V_5$, $V_6$, $V_7$ or $V_8$ are applied by way of lines 152, 156, 160 or 164, respectively, to an input line 235 of an output keyer 100. An audio tone input signal of, say 1020 cycles per second is applied at terminal 236 of the keyer 100. When a signal is applied to line 235, the audio tone signal passes through the keyer to the output terminal 166; when no signal appears on line 235, the audio tone signal is bypassed to ground. The input terminal 236 of keyer 100 is connected across a grounded resistor 238 to the grid element of a triode $V_{18}$ which is connected as a cathode follower. The cathode resistor 240 is connected between the cathode element of tube $V_{18}$ and ground. A pair of capacitors 241 and 242 are connected in series between ground and the junction of resistor 240 with the cathode element of tube $V_{18}$. A Zener diode 244 is connected across capacitor 242. Line 235 is connected through a resistor 246 to the ungrounded end of diode 244. The Zener diode is of such a polarity as to present a low impedance to ground to the output of the cathode follower $V_{18}$ in the absence of a signal on line 235. Under this condition, the audio tone input signal applied at terminal 236 passes through capacitor 241 and through the Zener diode 244 to ground. The application of a signal of a predetermined value to line 235 will cause the Zener diode to cut off and thus to present a high impedance to an output signal from the cathode follower $V_{18}$. This output signal can then no longer pass to ground and is diverted through capacitor 248 and across resistor 250 to the grid element of a second cathode follower $V_{19}$, causing this tube to conduct and to produce an output signal at the output terminal 166.

Referring now to FIG. 3b, the numeral 110 refers to the keyer cycling oscillator which is a free-running multivibrator operating to generate negative reset pulses at a predetermined rate. This predetermined rate is set according to the characteristics of the radio navigational aid facility being simulated. A switch 112 is provided to change the parameters of the multivibrator circuit and thus change the cycling rate. With the switch 112 set in one position the cycling rate of the multivibrator might be, for example, once every six seconds, while with the switch in the other position the rate might be once every thirty seconds. The output terminal 114 of the keyer cycling oscillator 110 is connected through capacitor 116 and diode 118 to the 0′ cathode of sequence generator tube 14 and through capacitor 117 and diode 119 to the 0 cathode of time unit generator tube 12. The negative signals thus applied to the two zero cathodes serve to reset the tubes 12 and 14 so that conduction takes place at their respective 0 cathodes, preparing the system for the start of a keying cycle.

The sequence guide driver 120, which is operated by a pulse from any one of the AND gates 53, 57, 59, 67, 69, 77, 79 or 87, provides out-of-phase voltages to the guide electrodes 18 and 19 which cause the conduction of tube 14 to commutate from one cathode to the next. The circuitry of the sequence guide driver 120 is shown in detail in FIG. 5. Input signals applied to the driver 120 are applied to the control grid of the amplifying and inverting tube $V_9$, causing this tube to be driven to conduction. Resistors 170 and 172 make up a voltage divider to which the grid of tube $V_9$ is connected and which serve to bias this tube. The amplified and inverted output signal obtained from tube $V_9$ is applied by way of potentiometer 174 to the input of a Schmitt trigger circuit 175 made up of tubes $V_{10}$ and $V_{11}$. This circuit, which is a standard trigger circuit, produces on line 176 a pulse having a constant peak value for the period that the input waveform from potentiometer 174 exceeds a specific value. This constant-valued pulse passes through a capacitor 178 to the movable arm of a potentiometer 180. Potentiometer 180 is connected between a bias source terminal 182 and ground, allowing line 176 to be adjustably biased so that only voltage pulses exceeding a predetermined value may appear thereon. The plate elements of diodes $V_9$, $V_{10}$ and $V_{11}$ are connected to the bias source terminal 182 through plate resistors 184, 185 and 186, respectively.

Figure 5:
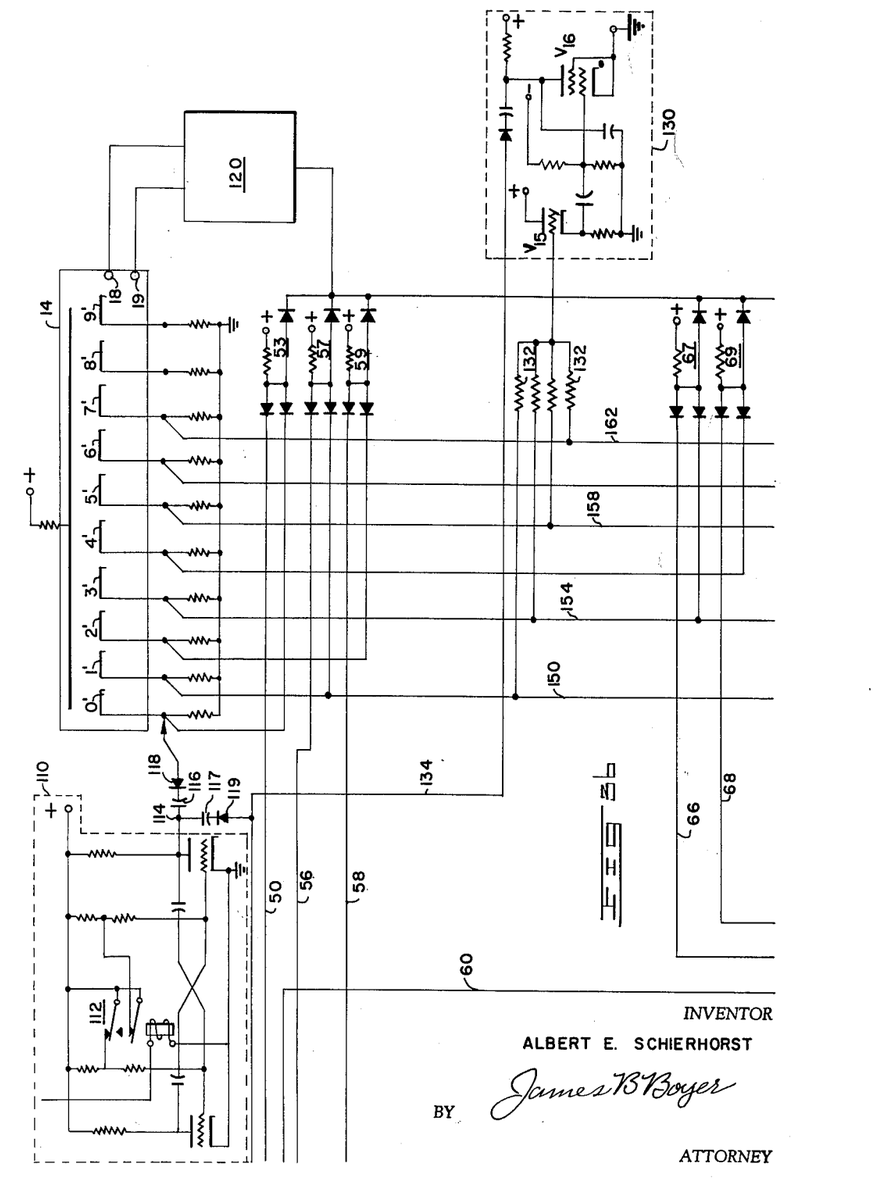
FIG. 5 is a schematic diagram of the sequence guide driver of FIG. 1.
Figure 5D:
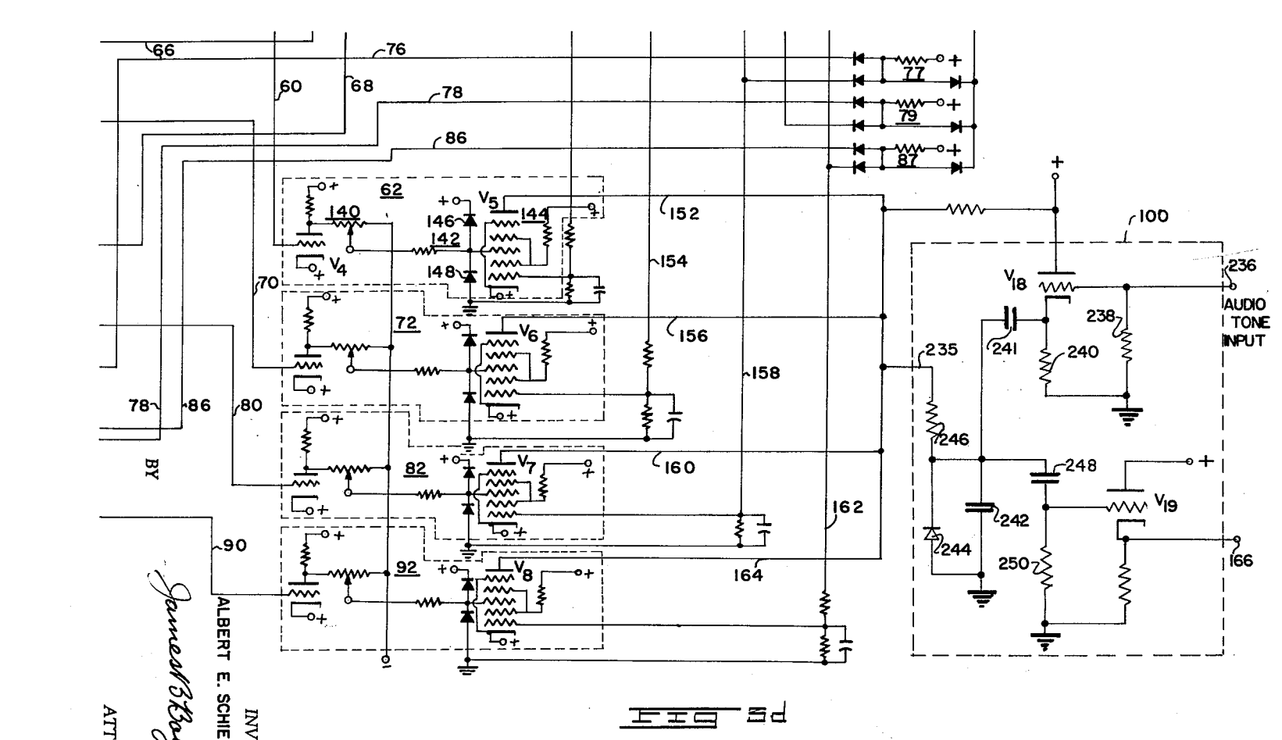

The pulses which appear on line 176 pass by way of line 187 to the input of a multivibrator 177 comprised of tubes $V_{12}$ and $V_{13}$ connected in a conventional manner. Thus, the plate element of tube $V_{12}$ is connected through a capacitor 188 to the grid element of tube $V_{13}$. The grid element of tube $V_{13}$ is further connected to a variable resistor 189 and resistor 190 to a bias source terminal 191. The plate elements of tubes $V_{12}$ and $V_{13}$ are connected to terminal 191 by way of plate resistors 192 and 193, respectively. The parameters of the multivibrator circuit are so arranged as to provide an output pulse at the plate of tube $V_{13}$ which will have a constant amplitude and a duration of ten milliseconds. Thus, each time an input signal appears on line 168 which is of sufficient amplitude to cause tube $V_9$ to conduct, the Schmitt trigger circuit 175 operates to produce a pulse on line 187 and the multivibrator 177 provides an output pulse of ten milliseconds' duration at the plate element of tube $V_{13}$. This signal is then applied through coupling capacitor 195, across the negatively biased resistor 197 to the grid element of a driver tube $V_{14}$. The cathode element of tube $V_{14}$ is connected to a voltage divider made up of the series connection of resistors 135 and 136 between the negative source terminal 137 and ground. In response to the ten milliseconds pulse received from multivibrator 177, tube $V_{14}$ provides an amplified output voltage of the same duration. This voltage is applied to the guide electrodes 18 and 19 by way of parallel delay circuits 122 and 124, each of which has a different time delay constant. The difference in time delay between circuits 122 and 124 results in a small phase difference in the parallel voltages applied to electrodes 18 and 19, thus enabling these voltages to commutate the conduction of sequence generator tube 14 from one cathode to the next. This commutation takes place in the same manner as that of tube 12, with the exception that the phase relationship between the voltages applied to terminals 18 and 19 is so small as to cause very rapid commutation.

The particular sequence guide driver shown in FIG. 5 is so arranged that spurious signals resulting from noise in the circuits will not cause the sequence generator tube 14 to be commutated at an improper time. In addition the provision of the multivibrator 177 with its ten milliseconds' output pulse insures positive commutation of the tube 14 upon the occurrence of an input signal on line 168.

As was mentioned with respect to FIG. 1, the appearance of a positive pulse on any of lines 150, 154, 158 or 162, resulting from the commutation of the conduction of tube 14 to a cathode associated with one of these lines results in the application of an input pulse to the time unit generator reset driver 130. This input signal is applied to the control grid of a cathode follower $V_{15}$ causing it to conduct. The output signal from $V_{15}$ is applied to the grid of a self-extinguishing thyratron $V_{16}$ causing it to fire, producing a single negative output pulse which is applied by way of line 134 to the 0 cathode of time unit generator tube 12. This negative signal serves to reset the conduction of tube 12 to the 0 cathode.

The operation of the call letter generator will now be described with reference to the schematic diagrams of FIGS. 3a, 3b, 3c and 3d and to the graphs of FIG. 2. To initiate the operation of the device, the keyer cycling oscillator provides a negative pulse output at terminal 114, which pulse is applied to the zero cathodes of the glow-transfer tubes 12 and 14. This event occurs at the time indicated by the vertical dotted line 202 of FIG. 2. This negative signal causes tube 14 to conduct through the 0' cathode and will usually cause tube 12 to conduct through its corresponding cathode 0. However, since keying rate generator 20 is free-running oscillator it will occasionally happen that commutating voltages will be applied to electrodes 16 and 17 simultaneously with the application of the negative pulse from cycling oscillator 110. This will result in the conduction beam of tube 12 flowing to cathode 1 rather than to cathode 0. Means must therefore be provided to insure that tube 12 is reset to zero before proceeding with the call letter generation in order to obtain proper output signals. This is accomplished by means of the synchronizer gate 53. Assuming the conduction of tube 12 to have been reset to cathode 1, the next cycle of the keying rate generator 20 will commutate the conduction beam to cathode 2. The time of occurrence of this event is indicated by the vertical dotted line 204 of FIG. 2. The curve 200 shown at the top of the drawing indicates the basic time unit of the system as established by the keying rate generator 20, the shaded portion of the cycles indicating the time elapsed during the commutation of the time unit generator 12 and the unshaded portions representing the time duration of static conduction through a cathode element.

Upon transfer of conduction to cathode 2 of tube 12 an output signal is produced on line 50 which signal is applied to one diode of synchronizer AND gate 53. Since cathode 0' of sequence generator tube 14 has been conducting up to this time a signal has also been applied to the other diode of gate 53. The coincidence of these signals causes gate 53 to provide an output signal which signal is applied to the grid of input amplifier $V_9$ of the sequence guide driver 120. This results in the application of out-of-phase pulses to guide electrodes 18 and 19, commutating the conduction of tube 14 to cathode 1'. This commutation is illustrated in FIG. 2 by curves 222 and 224 which show the waveforms of cathodes 0' and 1' of the sequence generator. The appearance of an output pulse from cathode 1' of tube 14 on line 150 provides an input signal to time unit generator reset driver 130. This input signal causes thyratron $V_{16}$ to fire, producing a reset pulse on line 134 which causes the conduction of tube 12 to be transferred from cathode 2 to cathode 0. This is illustrated in FIG. 2 which shows diagrammatically which cathodes of time unit generator 12 are conducting. As may be seen, at time 204 conduction transfers from cathode 2 to cathode 0 of time unit generator 12 effectively simultaneously with the commutation of conduction from cathode 0' to cathode 1' of sequence generator 14. The system is now set up for the generation of coded call letter signals.

To illustrate the operation of the device by means of a specific example, it will be assumed that the first call letter selector switch 40 is set to the letter A, that the second call letter selector switch 41 is set to the letter H, that the third selector switch 42 is set to the letter J and that the fourth letter selector switch 43 is set to the OFF position. With the time unit generator tube 12 set to cathode 0 and the sequence generator tube 14 conducting through cathode 1' the system is ready to operate, having positive signals appearing on lines 60 and 150. The positive signal on line 150 tends to open gating circuit 144 but the positive signal appearing on line 60 drives tube $V_5$ to cutoff and prevents an output signal from appearing on line 152. No signals appear on lines 154, 158 or 162, leaving tubes $V_6$, $V_7$ and $V_8$ cut off. At time 206 of FIG. 2, the keying rate generator 20 and the time unit guide driver 30 provide commutating voltages to electrodes 16 and 17 causing the conduction of tube 12 to shift first to electrode 16, then to electrode 17 and finally to cathode 1. During the time of this transfer, when the electrodes 16 and 17 carry the conduction current of tube 12, no signal appears on line 60. The absence of a signal on line 60 removes the cutoff signal from tube $V_5$, allowing an output to appear on line 152 as a result of the conduction of cathode 1' of tube 14. The output keyer 100 is triggered by the signal on line 152 and an output tone appears at terminal 166. This output tone lasts for the duration of the transfer from cathode 0 to cathode 1 of tube 12 since cathode 1 is connected to the left-most contact of position A of the first call letter selector 40. As soon as cathode 1 of tube 12 begins to conduct a positive signal is applied through movable contact 54 and isolating network 46 to line 60 which signal cuts off tube $V_5$. Since the transfer of conduction from one cathode to the next occurred during the lapse of one time unit, the output signal at terminal 166 was likewise one time unit in length, producing a Morse code dot. Cathode 1 of tube 12 remains conducting for one time unit before generator 20 and driver 30 provide voltages for another transfer. This produces a period of no output at terminal 166 equal to one time unit. This period of no output at terminal 166 provides the time unit spacing between the succeeding code characters of a letter which is required in the Morse system.

At the end of the time unit allotted for the conduction of cathode 1 the keying rate generator 20 and the time unit guide driver 30 provide voltages which transfer the conduction of tube 12 to electrodes 16 and 17. As before, when the conduction of the tube is through electrodes 16 and 17 the positive voltage on line 60 is removed, again allowing tube $V_5$ to conduct and to produce an output at terminal 166. In due course the conduction of tube 12 commutates to cathode 2. However, as may be seen from the labeling of the contacts of call letter selector 40, position A has no contacts connected to cathode 2. Therefore, no positive output signal can be applied from cathode 2 to output line 60, and tube $V_5$ continues to conduct. It is not until the conduction of tube 12 commutates to cathode 3 that tube $V_5$ stops its conduction. This is not accomplished by the presence of a positive voltage on line 60, since for position A cathode 3 is not connected to the isolating network 46. When cathode 3 starts its conduction, a signal is applied to line 56 through movable contact 84, which signal is applied to one diode of AND gate 57. This signal is a letter termination signal and, taken in conjunction with the signal applied to gate 57 from cathode 1' of tube 14, which is still conducting, causes gate 57 to provide an output signal to the sequence guide driver 120. This signal in turn causes the application of out-of-phase voltages to electrodes 18 and 19 of tube 14, resulting in the commutation of conduction from cathode 1' to cathode 2' of that tube. This commutation is almost instantaneous as may be seen by a comparison of waveforms 224 and 226 of FIG. 2, which illustrate the current flow through cathodes 1' and 2' of tube 14, respectively. The cessation of current flow through cathode 1' of tube 14 removes the positive signal from the grid of tube $V_5$, causing that tube to cut off and ending the production of output signals at terminal 166. As indicated by the vertical dotted line 208 of FIG. 2 the termination of output signals at terminal 166, which signals are represented by the cross-hatched blocks 207, due to the commutation of the conduction of tube 14 is coincident with the commutation of conduction of tube 12 from cathode 2 to cathode 3.

The elapsed time between the end of conduction of cathode 1 and the beginning of conduction of cathode 3 of the time unit generator tube 12 is three units, one unit for commutation from cathode 1 to cathode 2, one unit for conduction through cathode 2 and one unit for commutation from cathode 2 to cathode 3. Thus the output signal at terminal 166 is three units in length, providing a signal representing a Morse code dash. The letter termination signal appearing on line 56 indicated the end of the letter selected by call letter selector switch 40. The output signals provided by selector switch 40 were a dot and a dash which is the Morse code representation of the letter A.

A requirement of Morse code signaling is that a pause of three time units be provided between succeeding letters. This is accomplished in the present system in the following manner. After the conduction beam of tube 12 has been commutated to cathode 3 as above described, one time unit elapses before conduction is transferred to electrodes 16 and 17. Since the output tone at terminal 166 comes to an end at the start of the conduction of cathode 3 this time unit is the first of the required three unit pause. The second unit of the pause takes place during the commutation of the conduction of tube 12 from cathode 3 to cathode 4. Upon the initiation of conduction at cathode 4, a letter advance signal is applied through movable contact 94 to output line 58 and then to one of the diodes of gate 59. The conduction of tube 14 having been commutated to cathode 2' at the termination of the first call letter, the application of the letter advance signal causes gate 59 to provide an input to sequence guide driver 120, which input causes the conduction of tube 14 to be commutated from cathode 2' to cathode 3'. Immediately upon conduction of cathode 3' of tube 14 a positive signal is applied through line 154 to a control grid of tube $V_6$ of code generator gate 72 and through a resistance 132 to the time unit generator reset driver 130. Driver 130 immediately provides a negative reset pulse by way of line 134 to the 0 cathode of tube 12, causing the conduction of tube 12 to be immediately transferred to its 0 cathode. As may be seen from vertical dotted line 210 of FIG. 2 the transfer of conduction from cathode 2' to cathode 3' of tube 14 and from cathode 4 to cathode 0 of tube 12 takes place at or near the beginning of the third time unit of the three unit pause. This sequence of events resets the system and prepares it for generation of the second call letter.

Figure 2:
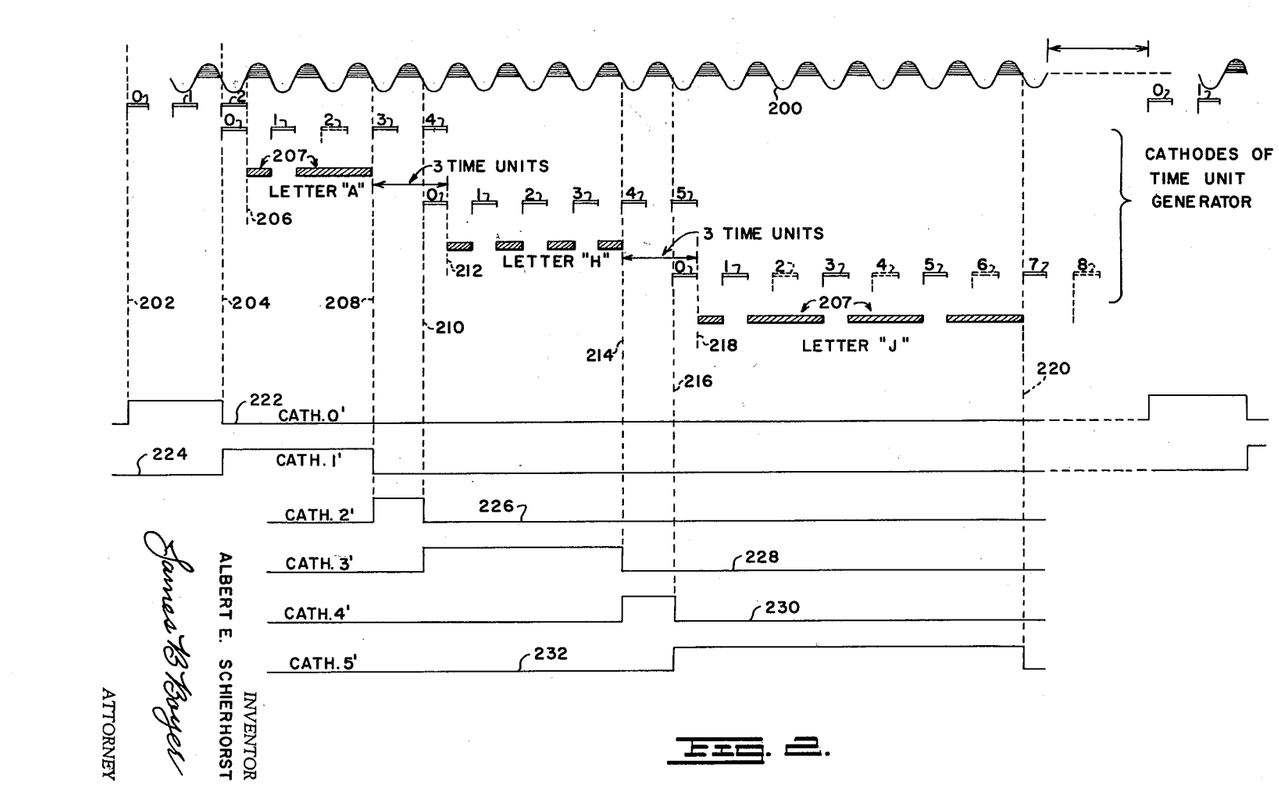
FIG. 2 is a graphic showing of the sequence generator waveforms and of the output signals for three selected call letters.

At the end of the time unit during which the conduction of tube 12 was transferred to cathode 0, shown in FIG. 2 at 212, the keying rate generator 20 and the time unit guide driver 30 provide out-of-phase voltages to electrodes 16 and 17 to commutate the conduction to cathode 1. Assuming the second call letter selector switch 41 to be set at the letter H, the positive signal which was applied to line 70 upon the resetting of tube 12 will be removed until conduction is established through cathode 1, which is connected to the movable contact 54' of selector switch 41. Thus, during the commutation of the signal from cathode 0 to cathode 1 an output signal of one time unit in length will be applied to the output keyer 100 through tube $V_6$. Similarly, as commutation of tube 12 proceeds from cathode 1 to cathode 2 to cathode 3 and finally to cathode 4 through movable contacts 64', 74' and 84' of selector switch 41, positive signals will alternate with the absence of signals on line 70, producing a series of four dots at output terminal 166, each dot as well as the periods therebetween being one time unit in length. As is indicated at vertical dotted line 214 of FIG. 2, upon the initiation of conduction of cathode 4 of tube 12 a letter termination signal will be applied through movable contact 84' to output line 66 and to one diode of gate 67. Tube 14, having its conduction through cathode 3', also applies a signal to one diode of gate 67 resulting in a signal being applied to sequence guide driver 120 to commutate the conduction of tube 14 from cathode 3' to cathode 4'. This commutation removes the signal applied to the control grid of tube $V_6$ over line 154 and causes that tube to stop conducting. AND gate 67 is also disabled by this transfer of conduction. The signal from cathode 4' is applied to one of the diodes of gate 69. Upon commutation of the conduction of tube 12 to cathode 5 a letter advance signal is applied to the other AND diode of gate 69 through movable contact 94' of selector switch 41 and through line 68. The resulting output signal from gate 69 causes the conduction of tube 14 to commutate to cathode 5', resetting time unit generator 12 to the 0 cathode and applying a signal through line 158 to the control grid of tube $V_7$ of the code generator 82.

With the conduction of tube 12 re-established at the 0 cathode, at time 216 of FIG. 2, and a signal being applied to tube $V_7$ of the inverter and code generator gate 82 the system is prepared for the generation of the third call letter which, for purposes of illustration, is assumed to be the letter J. At the time indicated by the vertical dotted line 218 the conduction of tube 12 is transferred from cathode 0 to the guide electrodes 16 and 17, removing the positive signal which was present on line 80 during the conduction of the 0 cathode. This enables the inverter and code generator gate 82 to provide an output signal on line 160 which in turn triggers the output keyer 100 and provides a signal on output terminal 166. As in the prior examples, when the conduction of tube 12 is transferred under the control of keying rate generator 20 and time unit guide driver 30 to cathode 1, tube $V_7$ is driven to cutoff. When cathode 1 of tube 12 ceases its conduction no signal will appear on line 80 until the start of conduction of cathode 3 which is connected to line 80 through movable contact 64" of selector switch 42. The positive signal present during the conduction of cathode 3 of tube 12 is removed from line 80 at the end of conduction of cathode 3 and no signal appears thereon until cathode 5, which is connected to line 80 through movable contacts 74" of selector switch 42, starts its conduction. The positive cutoff signal continues until the conduction of tube 12 is commutated away from cathode 5, at which time tube $V_7$ again begins to conduct. Tube $V_7$ continues to conduct until tube 12 commutates to cathode 7. At this time a letter termination signal is passed through movable contact 84" and through line 76 to one diode of gate 77. The coincidence of this signal and the signal applied to gate 77 from cathode 5' of tube 14 provides an output signal to sequence guide driver 120 which causes the conduction of tube 14 to commutate to cathode 6'. This removes the signal applied to the control grid of tube $V_7$ and causes it to cut off. If selector switch 43 is in the OFF position, movable contact 104''' of selector switch 43 will be grounded and no letter advance signal will be passed from movable contact 94" of selector switch 42. No signal can then be applied to sequence guide driver 120 and the operation comes to an end as is indicated at the vertical dotted line 220 of FIG. 2.

No further signals will be generated by the system of FIG. 1 until a reset signal is received by the system from the keyer cycling oscillator 110. Such a signal causes the conduction of both tubes 12 and 14 to be reset to their respective 0 and 0' cathodes. Since the keyer cycling oscillator is free-running, such reset signals will be applied to the system periodically at a rate determined by the parameters of the oscillator. Thus, when the system is under the control of oscillator 110, the selected call letters will repeat themselves automatically until the device is turned off or until the call letter selector switches are set to new call letters. When the latter occurs the system will then automatically repeat the new set of call letters.

If desired, reset signals corresponding to those obtained from the oscillator 110 may be applied to the system by means other than a free-running oscillator, allowing the generation of call letters to be initiated by some other suitable means. Thus, for example, a manually operated switch could be provided which would supply a reset signal to the system at any desired time, which time may be randomly selected by an operator. Another method of providing reset pulses to the system is illustrated diagrammatically in FIG. 6. This method contemplates the use of the coded message generator in combination with a recorded spoken message wherein the coded pulse message and the voice message may be alternated. In such a system, a voice recorder (not shown) of any suitable type, such as, for example, a magnetic tape recorder, may be used to carry the spoken message. In addition to carrying this message, the recorder would also carry means for providing a reset pulse for the coded message generator system to initiate the generator system upon completion of the voice message. Any number of reset pulses may be provided to allow repetition of the pulse message between successive voice messages. Such a reset pulse might be derived from the recorder by mechanical, photoelectric, or electronic means. Such means might include a commutator with a wiper arm, light intermittently striking a photoelectric cell, or a trigger pulse recorded on the voice tape, which pulse might be separated from the voice signals by passing it through filtering and detecting means. The signals thus derived from the recording means may be applied to a reset driver 106 having circuitry similar to the time unit generator reset driver 130. By modifying the circuit of FIG. 1 in the manner shown in FIG. 6, the system of FIG. 1 may be utilized in combination with a voice recorder or may be set to automatically cycle under the control of the keyer cycling oscillator 110. A two-way switch 107 may be connected between the terminal 114 and either the driver 106 or the oscillator 110 to provide voice or automatic cycling as desired.

The various systems described above provide coded output pulses representing any selected sequence of call letters, and in doing so meet the requirements for Morse code transmission. That is, each Morse dot is one time unit in length, each dash is three time units in length, one time unit separates the succeeding code characters making up a single letter and three time units appear between succeeding letters, no matter what the length of the letter may be. In addition, the individual call letters are automatically sequenced. Further, the rate at which each call letter is produced and the rate at which the group of call letters is repeated are remotely adjustable by means of switches 26 and 112, respectively. Finally, by means of an arrangement such as that shown in FIG. 6 recorded voice messages may be included in the message generating sequence. Thus, the various types of radio navigational aids may be accurately simulated by the system disclosed herein.

While the fundamental features of the invention have been pointed out with reference to a specific embodiment, it will be understood that various omissions and substitutions in the system as illustrated may be made by those skilled in the art without departing from the spirit of the invention.

What is claimed is:

1. An electronic call letter keyer comprising a plurality of call letter selectors, first means for converting the selected call letters into coded electrical pulses, gating means, second means for sequencing said gating means to allow the coded pulses representing each call letter to pass one after another through said gating means, and output means connected to said gating means for providing a series of coded audio pulses representing said selected call letters, said first means comprising a first cold-cathode, glow-transfer tube having a plurality of cathode elements connected to said call letter selectors, and further including third means for commutating the conduction beam of said first glow-transfer tube from one cathode to the next, sequentially, at a predetermined rate.

2. The device of claim 1, wherein said third means comprises a keying rate oscillator and a guide driver connected to said oscillator, said guide driver providing trigger pulses to the guide electrodes of said glow-transfer tube.

3. The device of claim 1, wherein said second means comprises a second cold-cathode, glow-transfer tube having a plurality of cathode elements, the cathode elements of said second glow-transfer tube being connected to operate said gating means, and further including fourth means for commutating the conduction beam of said second glow-transfer tube from one cathode to the next, sequentially, in response to termination pulses representing the end of a call letter.

4. An all-electronic call letter generator comprising a time unit generator, a plurality of call letter selector switches connected to said time unit generator, gating means connected to the output of each said selector switch, a sequence generator, said time unit generator and said sequence generator each including a cold-cathode glow-transfer tube having a plurality of cathode elements, each of said gating means being connected to said sequence generator to be brought into conduction sequentially by means of signals supplied thereto by said sequence generator, the conduction beam of said cold-cathode glow-transfer tubes being transferred from one cathode to another, the duration of said transfer of conduction in said time unit generator being equal to the duration of static conduction through one of its cathodes, and the duration of said transfer of conduction in said sequence generator being small with respect to the duration of conduction through its cathodes, whereby coded signals representing a selected call letter are obtained from each conducting gate means.

5. An all-electronic call letter generator comprising a time unit generator, a plurality of call letter selector switches connected to said time unit generator, gating means connected to the output of each said selector switch, a sequence generator, said time unit generator and said sequence generator each including a cold-cathode glow-transfer tube having a plurality of cathode elements, each of said gating means being connected to said sequence generator to be brought into conduction sequentially by means of signals supplied thereto by said sequence generator, each of said plurality of call letter selector switches having at least one position for each letter of the alphabet, and each of said positions having a plurality of stationary contacts, each of said contacts being connected to one of said plurality of cathode elements of said time unit generator, each of said selector switches having a plurality of movable contacts engageable with the stationary contacts of any selected one of said positions, whereby coded signals representing a selected call letter are obtained from each conducting gating means.

6. The device of claim 5 wherein each of said gating means comprises an inverter and a code generator, said inverter producing, in response to input signals of one polarity received from its associated selector switch, a signal of reverse polarity, means for applying said signal of reverse polarity to said code generator to drive it to cutoff, said code generator being able to produce said coded signals only in the absence of said signal of reverse polarity.

7. The device of claim 6 and further including a trigger circuit, means for applying the coded signals produced by said code generator to the input terminal of said trigger circuit to cause said trigger circuit to conduct for the duration of each of said signals, means responsive to the conduction of said trigger circuit for supplying audio signals to the output of said call letter generator whereby coded audio output signals representative of selected call letters are obtained.

8. In a call letter keyer for providing a pulsed message output cycle, a time unit generator having spaced output signals, a plurality of call letter selector switches, means for applying said spaced output signals to said plurality of call letter selector switches, gating means connected to each of said call letter selector switches, a sequence generator for operating said gating means sequentially to enable said call letter keyer to provide a pulsed message output, means for resetting said time unit generator upon completion of each call letter, and reset means for resetting said sequence generator after the completion of said pulsed message output cycle, said reset means serving also to initiate a new cycle, means for inserting a voice message between successive cycles, said reset means being connected to said voice message inserting means for supplying a reset pulse thereto for synchronizing the voice message with the cycling of the keyer.

9. The device of claim 8, wherein said reset means comprises a keyer cycling oscillator to provide automatic recycling of said keyer.

10. The device of claim 8, wherein said reset means is manually operable.

References Cited in the file of this patent

UNITED STATES PATENTS

| | | |
|---|---|---|
| 2,407,336 | Young | Sept. 10, 1946 |
| 2,495,739 | Labin | Jan. 31, 1950 |
| 2,715,782 | Cooper et al. | Aug. 23, 1955 |
| 2,848,647 | Kuchinsky | Aug. 19, 1958 |
| 3,007,001 | Schierhorst | Oct. 31, 1961 |

FOREIGN PATENTS

| | | |
|---|---|---|
| 820,923 | Great Britain | Sept. 30, 1959 |